United States Patent

Tani

Patent Number: 5,233,596
Date of Patent: Aug. 3, 1993

[54] OPTICAL RECORDING/REPRODUCING APPARATUS INCLUDING BOTH AUTOMATIC POWER CONTROL AND TEMPERATURE-BASED DRIVE CURRENT CONTROL

[75] Inventor: Naoaki Tani, Tokyo, Japan

[73] Assignee: Olympus Optical Co., Ltd., Tokyo, Japan

[21] Appl. No.: 787,048

[22] Filed: Nov. 4, 1991

[30] Foreign Application Priority Data

Nov. 5, 1990 [JP] Japan .................................. 2-297179

[51] Int. Cl.⁵ ............................................. G11B 7/125
[52] U.S. Cl. .................... 369/116; 369/121; 369/122
[58] Field of Search ............... 369/116, 121, 122, 53, 369/54, 100, 106

[56] References Cited

U.S. PATENT DOCUMENTS

| | | | |
|---|---|---|---|
| 4,843,604 | 6/1989 | Fujiwara et al. | 369/116 |
| 4,858,220 | 8/1989 | Funada | 369/116 |
| 4,935,915 | 6/1990 | Fujiwara et al. | 369/116 |

FOREIGN PATENT DOCUMENTS 1-196733  8/1989  Japan .

Primary Examiner—Paul M. Dzierzynski
Assistant Examiner—James Beyer
Attorney, Agent, or Firm—Frishauf, Holtz, Goodman & Woodward

[57] ABSTRACT

An optical recording/reproducing apparatus comprises a semiconductor laser, and a drive circuit for supplying a drive current to the semiconductor laser. A light beam from the semiconductor laser is converged on a recording medium through an objective lens. A photodiode for receiving the light beam is provided within the semiconductor laser. A monitor output from the photodiode is input to an APC circuit. The APC circuit includes a reference value generator and an error detector circuit. The error detector circuit detects a difference between the monitor output and a reference value, and outputs a control signal for controlling the drive circuit so as to keep the monitor output constant. The APC circuit is turned on/off by a controller. With the APC circuit turned on, the controller detects the temperature or temperature variance of the on the basis of the drive current monitor signal from the drive circuit and the pre-stored data of the semiconductor laser with respect to temperatures. With the APC circuit turned off, the semiconductor laser is supplied with a constant drive current from the drive circuit. The value of the drive current is set by the controller on the basis of the temperature detected just before the APC circuit is turned off and the pre-stored data on the characteristic of the semiconductor laser with respect to temperatures.

1 Claim, 2 Drawing Sheets

OPTICAL RECORDING/REPRODUCING APPARATUS INCLUDING BOTH AUTOMATIC POWER CONTROL AND TEMPERATURE-BASED DRIVE CURRENT CONTROL

BACKGROUND OF THE INVENTION

1. Field of the Invention

The present invention relates to an optical recording-/reproducing apparatus using a semiconductor laser.

2. Description of the Related Art

Optical recording/reproducing apparatuses include an apparatus for recording information on an optical recording medium by radiating a light beam emitted from a semiconductor laser onto the recording medium, an apparatus for reproducing information recorded on a recording medium, and an apparatus having both functions of recording and reproducing information.

In general, in a semiconductor laser, a threshold current $I_{th}$ at which a light output from the laser rises abruptly is increased in accordance with the rise of temperature, on the basis of the following equation:

$$I_{th} = k \exp(T_i/T_o)$$

where k is a constant, a $T_i$ is a virtual junction temperature, and $T_o$ is a constant called "characteristic temperature" which is about 50° to 200 [° K]. In addition, in a region (oscillation region) where a drive current is higher than a threshold current, the variance degree (differential efficiency) of the light output in relation to the variance degree of current depends on temperatures. FIG. 3 is a graph showing the relationship between a drive current and a light output of a semiconductor laser. FIG. 3 shows two curves representing operation characteristics at different temperatures $T_1$ and $T_2$ ($T_1 < T_2$) and threshold currents $I_{th1}$ and $I_{th2}$ of the corresponding operation characteristics. Because of this characteristic, even if the variance of drive current due to a temperature at a certain light output is corrected by an APC (Automatic Power Control) operation and thereafter constant-current drive is carried out in order to obtain a light output different from the light output obtained at the APC operation time, a desirable light output cannot be obtained owing to a variance in differential efficiency with respect to temperature. Consequently, the intensity of light beam radiated on a recording medium is varied.

Published Unexamined Japanese Patent Application (PUJPA) No. 1-196733, for example, discloses a prior art technique for solving the above problem. According to this technique, a drive current for a semiconductor laser is controlled by a signal from temperature detecting means for detecting the temperature within a drive unit, thereby controlling the intensity of a light beam radiated on the recording medium. This temperature control method will now be described with reference to FIG. 4. A divergent light beam emitted from a semiconductor laser 1 is changed to a parallel beam through a collimator lens 2. The parallel beam is converted through an objective lens 3. Thus, a beam spot 8 forms on an information recording surface of an optical recording medium 4 such as an optical card or an optical disc. A temperature sensor 6 senses a temperature within the drive unit. Detected data on temperature is sent to a controller 7. On the basis of the pre-set data on the relationship between the temperature within the drive unit and the intensity of light beam, the controller 7 generates a control signal for driving a semiconductor laser drive circuit 5. Upon receiving the control signal, the semiconductor laser drive circuit 5 supplies the semiconductor laser 1 with a constant current for enabling the laser 1 to output a light beam with an optimal intensity in relation to the present temperature within the drive unit. This sequence of operations are constantly carried out to keep the optimal intensity of the light beam of the semiconductor laser 1 in relation to the temperature within the drive unit.

According to this method, since the temperature within the drive unit is detected, the temperature variance of the semiconductor laser due to the temperature variance within the drive unit can be corrected. However, the time constant of the thermal diffusion in the drive unit is greater than that of the temperature variance of the semiconductor laser itself. Thus, this method cannot correct a temperature variance occurring within the semiconductor laser in a relatively short time period after a high-output driving operation such as a recording operation. As a result, the intensity of a light beam radiated on a recording medium varies.

SUMMARY OF THE INVENTION

The object of the present invention is to provide an optical recording/reproducing apparatus wherein the intensity of light beam is always kept at an optimal value even if the temperature of a semiconductor laser is varied.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates a presently preferred embodiment of the invention and, together with the general description given above and the detailed description of the preferred embodiment given below, serves to explain the principles of the invention.

DETAILED DESCRIPTION OF THE PREFERRED EMBODIMENT

Figure 1:
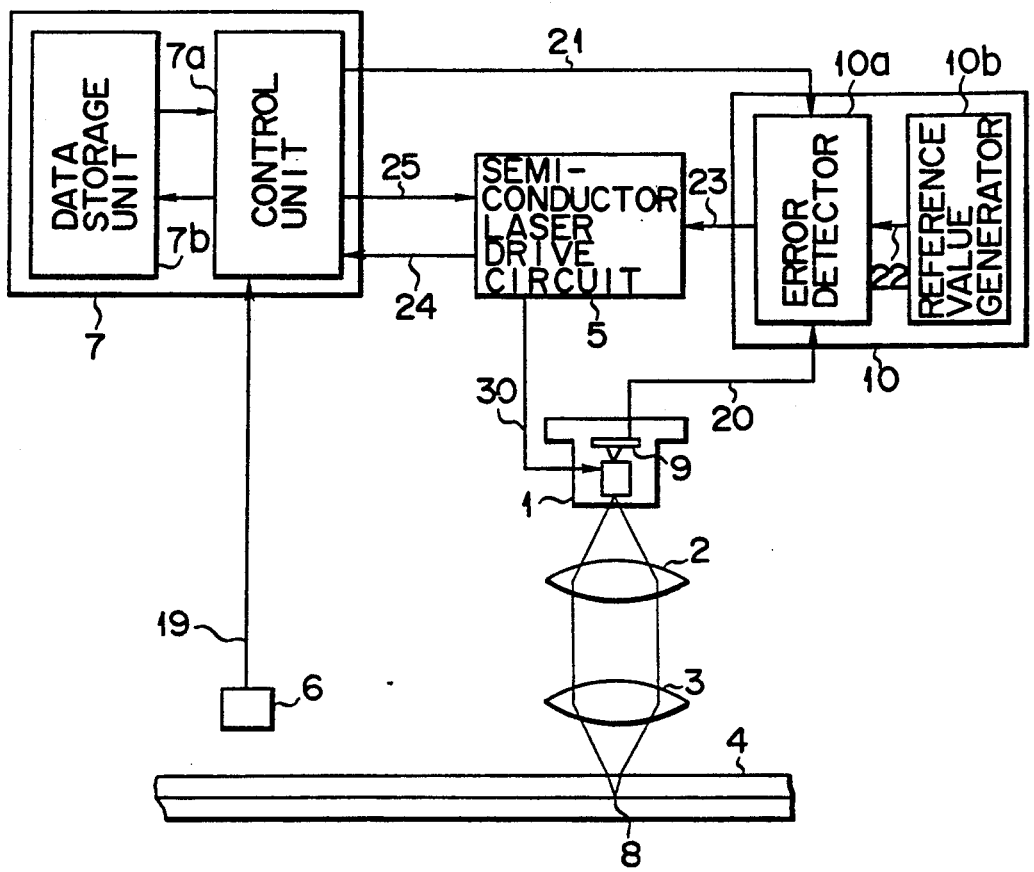
FIG. 1 shows an optical recording/reproducing apparatus according to an embodiment of the present invention.

As is shown in FIG. 1, a divergent beam from a semiconductor laser 1 is changed to a parallel beam through a collimator lens 2. The parallel beam is converged through an objective lens 3, thereby forming a beam spot 8 on an information recording surface of an optical recording medium 4. A temperature sensor 6 senses the temperature within an optical recording/reproducing apparatus, and delivers an apparatus-inside temperature signal to a control unit 7a of a controller 7.

The semiconductor laser 1 includes a monitor photodiode 9 for receiving a rear emission beam on the rear side of a semiconductor laser chip. A monitor output 20 from the monitor photodiode 9 is sent to an APC circuit 10. The APC circuit 10 includes an error detector 10a and a reference value generator 10b for generating a preset reference value 22. The APC circuit 10 turns on/off the APC operation in accordance with an APC control signal 21 from the control unit 7a of the controller 7.

With the APC operation turned on, the error detector 10a compares the monitor output 20 and the reference value 22, and outputs an error signal 23 to a semiconductor laser drive circuit 5. In accordance with the error signal 23, the drive circuit 5 controls (increases/decreases) a drive current 30 to the semiconductor laser 1. Accordingly, the drive current 30 is negative-feedback controlled so as to keep the monitor output 20 constant, and, even if a temperature variance occurs, the light output of the semiconductor laser is kept constant.

With the APC operation turned off, the error detector 10a of the APC circuit 10 stops the generation of the error signal 23. Thus, the semiconductor laser drive circuit 5 generates drive current 30 corresponding to a drive current control signal 25 output from the control unit 7a of controller 7, thereby controlling the semiconductor laser 1 with a constant current.

Figure 2:
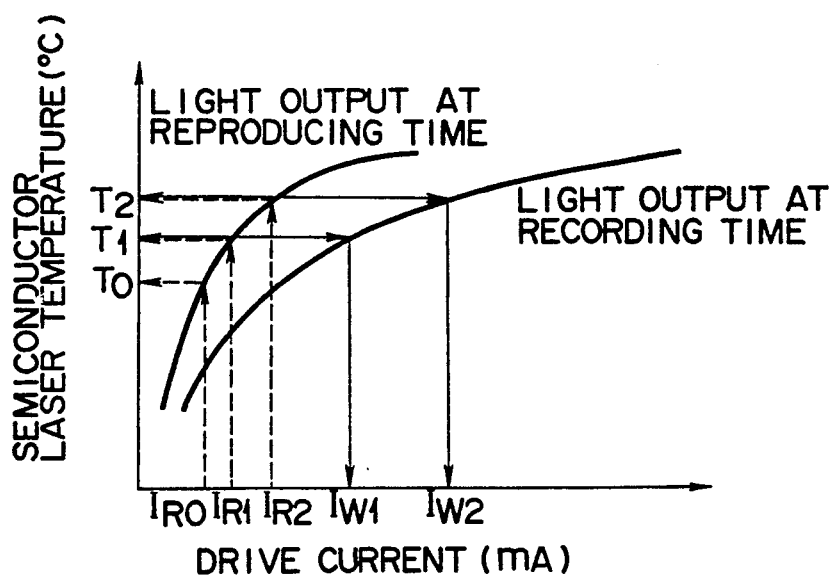
FIG. 2 is a graph showing the relationship between a drive current and a semiconductor laser temperature in relation to a constant output.
Figure 3:
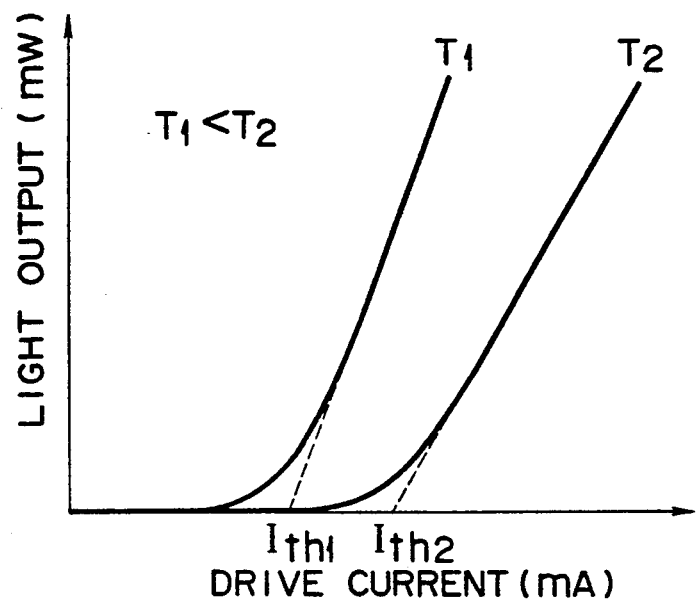
FIG. 3 is a graph showing the operation characteristic of a semiconductor laser.
Figure 4:
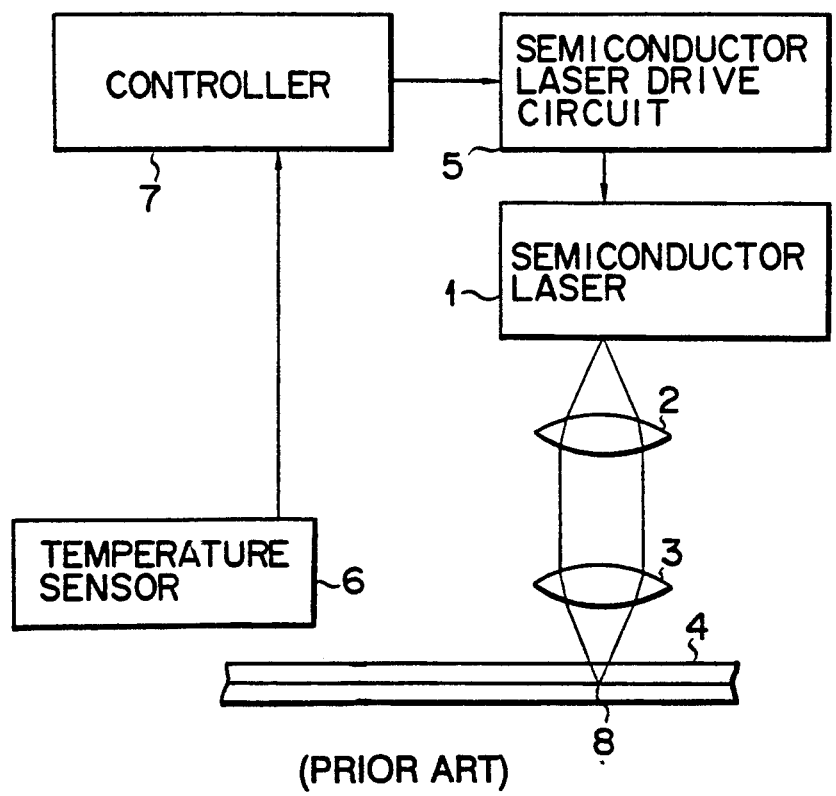
FIG. 4 shows an example of a conventional optical recording/reproducing apparatus.

While the information recorded on the recording medium is reproduced, the APC operation is carried out and thereby the light output from the semiconductor laser 1 is kept constant even if temperature variance occurs, as stated above. However, the drive current 30 for the semiconductor laser 1 varies in accordance with heat of the semiconductor laser 1 and a temperature variance of the semiconductor laser 1 due to a temperature in the apparatus. The variance of the drive current 30 is told to the control unit 7a of controller 7 by a drive current monitor signal 24. The controller 7 comprises the control unit 7a for carrying out signal input/output and signal processing, and a data storage unit 7b which stores in advance the data on the relationship between the drive current and semiconductor laser temperature, as shown in FIG. 2. The control unit 7a detects the temperature or temperature variance of the semiconductor laser on the basis of the variance of the drive current monitor signal 24, by referring to the data stored in the data storage unit 7b.

For example, in FIG. 2, when the drive current changes from $I_{R0}$ to $I_{R1}$, the variance of temperature of the semiconductor laser from $T_0$ to $T_1$ can be detected since the light output at the reproducing time is kept constant by the APC operation.

At the time of recording information on the recording medium, the light output of the semiconductor laser is modulated at intervals shorter than the time constant of the APC operation. Thus, the APC operation is turned off, and the drive current is directly modulated. Accordingly, the operation mode of the semiconductor laser 1 is switched to the constant-current drive mode. In this case, the control unit 7a of controller 7 obtains the drive current by referring to the data of light output at the recording time in the data storage unit 7b, on the basis of the temperature of the semiconductor laser detected just before the APC operation is turned off and the operation mode is switched to the constant current drive mode.

In FIG. 2, for example, the controller 7 detects temperature $T_1$ of the semiconductor laser on the basis of the light output data at the reproducing time, if the drive current at the reproducing time just before recording is $I_{R1}$ at first. Accordingly, the controller 7 determines that the optimal value of the drive current at the recording time is $I_{w1}$ at temperature $T_1$ on the basis of the light output data at the recording time, and the controller 7 outputs the drive current control signal 25 to the semiconductor laser drive circuit 5 so as to set the drive current 30 at value $I_{w1}$. In addition, when the temperature of the semiconductor laser rises to $T_2$ at the recording time, the APC operation is turned on at the reproducing time just after the recording, the drive current 30 of a value $I_{R2}$, which enables a constant light output to be generated at temperature $T_2$, is supplied to the semiconductor laser. Thus, the control unit 7a detects that the temperature is $T_2$ on the basis of the drive current monitor signal 24 and the light output data in the data storage unit 7b at the reproducing time. If the recording is effected thereafter once again, the control unit 7a finds an optimal value of the drive current on the basis of the detected temperature $T_2$ the light output data at the recording time stored in the data storage unit 7b, and outputs the drive current control signal 25 to set the drive current 30 at $I_{w2}$.

As has been described above, even in the case where the recording and reproducing are repeated at short cycles, an abrupt temperature change of the semiconductor laser due to a high light output at the recording time is detected at the subsequent reproducing time. In the next recording time, the drive current set value is controlled to provide an optimal light beam intensity.

The present invention is not limited to the above embodiment, and various changes and modifications may be made without departing from the spirit of the present invention. For example, in the above embodiment, the output of the monitor photodiode provided within the semiconductor laser is employed for APC drive of the semiconductor laser; however, it is possible to provide a photodetector midway along a light passage between the semiconductor diode and the recording medium, and utilize the output of the photodetector for the APC drive. It is also possible to change the drive current set value at the constant-current drive mode when the temperature variance degree in the APC drive mode exceeds a predetermined value, and to cut off the drive current to prevent thermal destruction of the semiconductor laser when the temperature in the APC drive mode exceeds a predetermined value. Obviously, the present invention is applicable irrespective of the method of information recording (e.g. "non-erasable" method, photo-electro-magnetic recording method, phase-shift method, etc.) and the type of the recording medium (a card type medium, disc type medium, tape type medium, etc.).

What is claimed is:

1. An optical recording/reproducing apparatus wherein a light beam is radiated on a recording medium to thereby effect information recording/reproducing, said apparatus comprising:
    a semiconductor laser for generating the light beam;
    radiation means for radiating the light beam onto the recording medium;
    drive means for supplying a drive current to the semiconductor laser, thereby driving the semiconductor laser, the drive means comprising:

first drive means for driving the semiconductor laser with the drive current so as to keep an output value of the light beam generated by the semiconductor laser constant; and second drive means for controlling the drive current such that the drive current has a constant value, the constant value drive current being supplied to the semiconductor laser by said second drive means;

said first drive means comprising:
first detection means for detecting the output value of the light beam generated by the semiconductor laser;
reference value generating means for generating a reference value signal; and
means for comparing an output signal from the first detection means with the reference value signal and for controlling the drive current supplied to the semiconductor laser so as to reduce a difference between the output signal from the first detection means and the reference value signal, to zero;

control means for controlling the first and second drive means, said control means comprising:

switch means, responsive to the control means, for switching one of the first drive means and the second drive means to the semiconductor laser, so that one of the output value of the light beam generated by the semiconductor laser and the drive current supplied by the second drive means to the semiconductor laser, is kept constant;

a data storage unit for storing data relating to a drive current characteristic of the semiconductor laser with respect to a plurality of temperatures;

second detection means for monitoring a value of the drive current supplied from the first drive means to the semiconductor laser and for detecting a temperature of the semiconductor laser on the basis of the data stored in the data storage unit relating to the drive current characteristic of the semiconductor laser with respect to the plurality of temperatures; and a control unit for setting a value of the drive current supplied from the second drive means to the semiconductor laser, on the basis of the temperature detected by the second detection means.

* * * * *